Aug. 9, 1949.  D. E. GERMAIN  2,478,187
RAILROAD CAR CONSTRUCTION
Filed Oct. 12, 1945  2 Sheets-Sheet 1
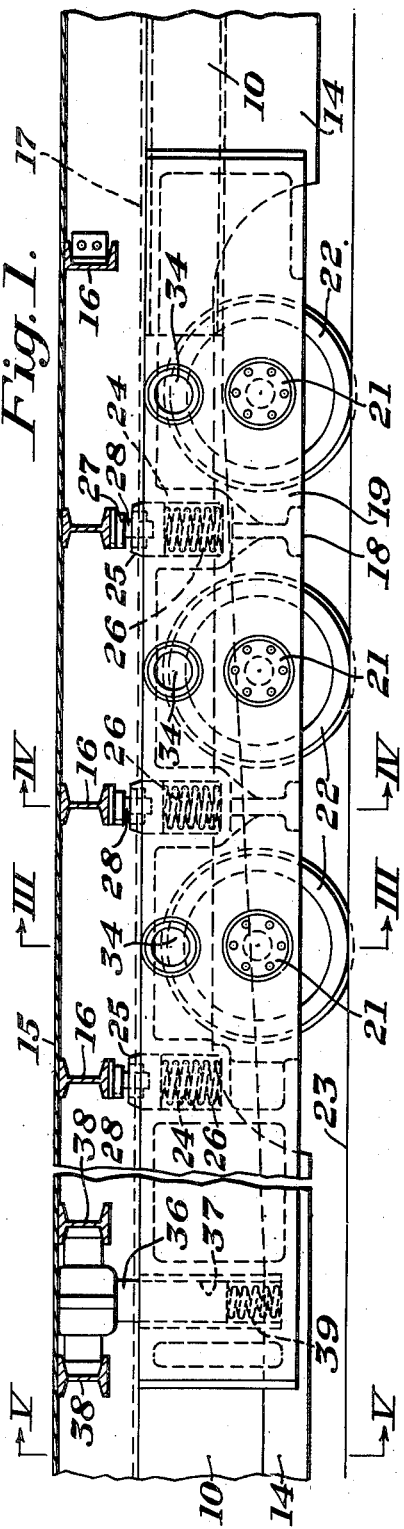
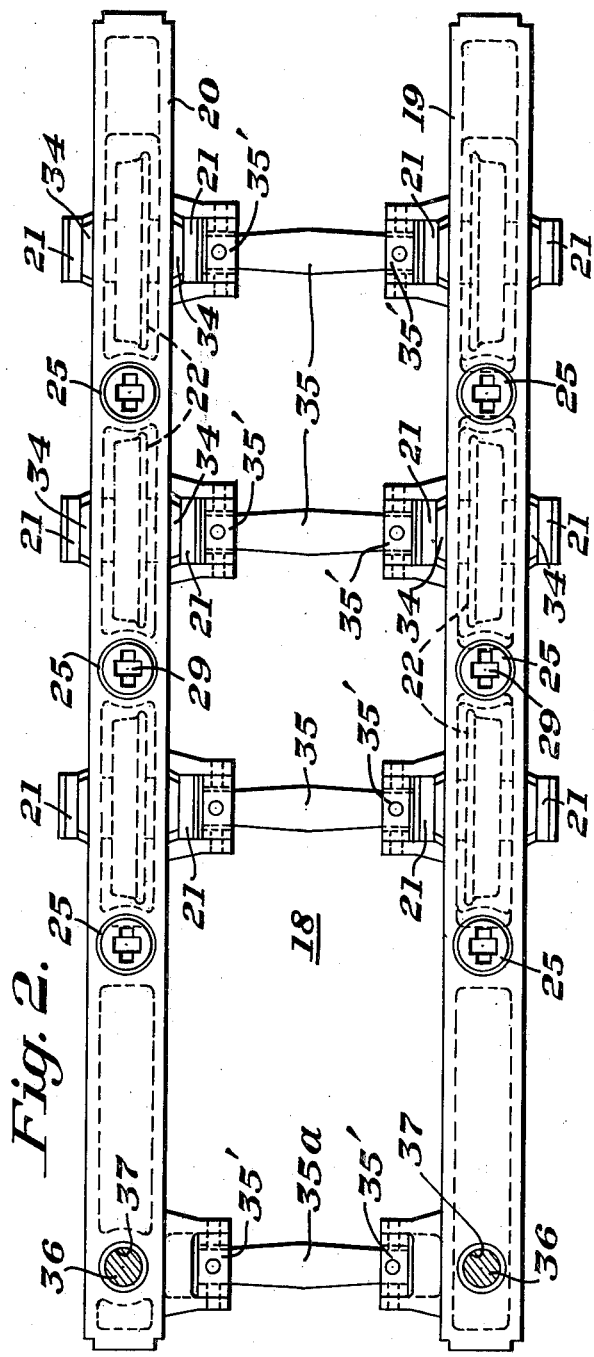
INVENTOR
David E. Germain
by his attorneys
Stebbins, Blenko & Webb Aug. 9, 1949.  D. E. GERMAIN  2,478,187
RAILROAD CAR CONSTRUCTION
Filed Oct. 12, 1945  2 Sheets-Sheet 2
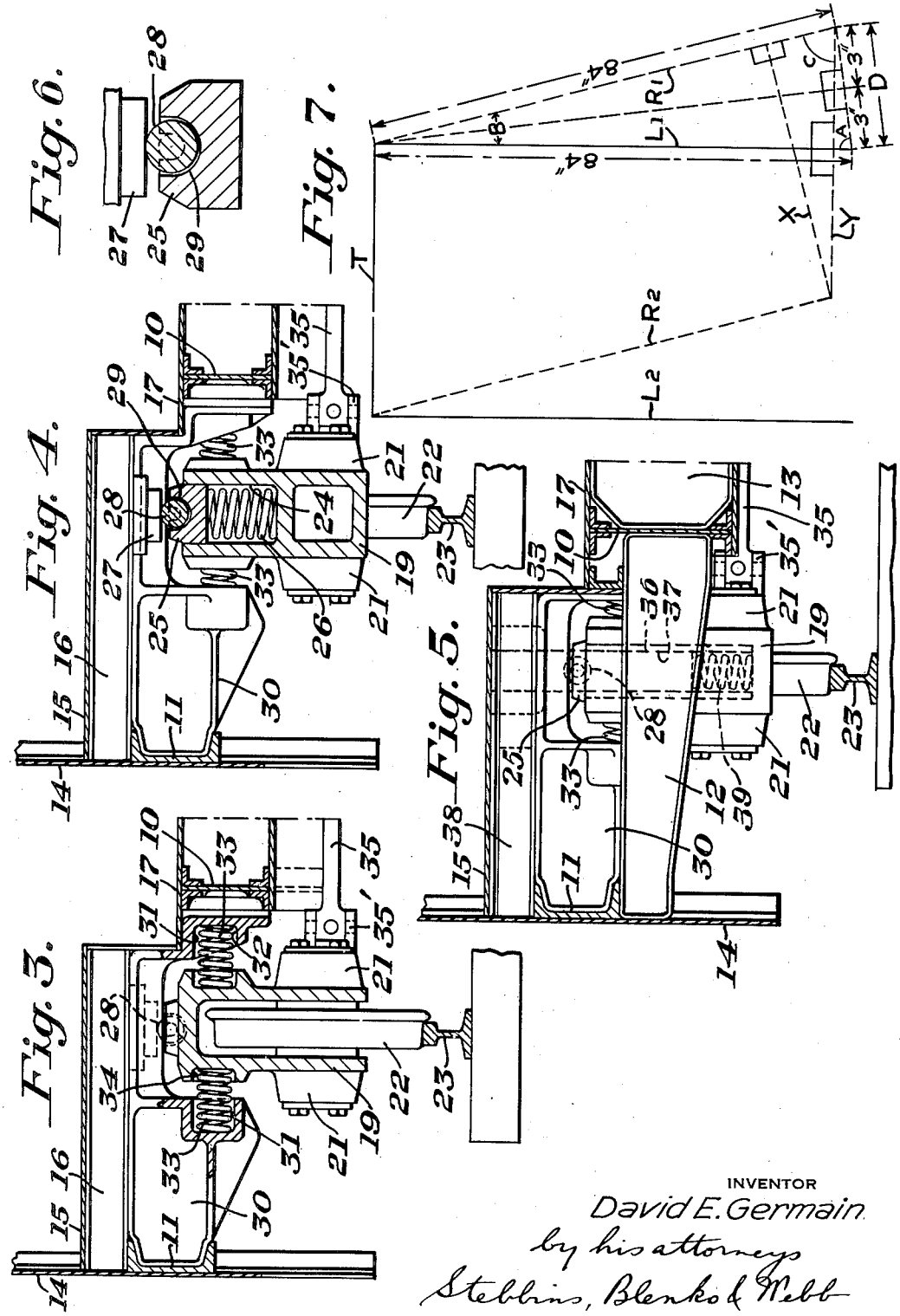
INVENTOR
David E. Germain
by his attorneys
Stebbins, Blenko & Webb Patented Aug. 9, 1949

2,478,187

UNITED STATES PATENT OFFICE 2,478,187

RAILROAD CAR CONSTRUCTION

David E. Germain, Pittsburgh, Pa.

Application October 12, 1945, Serial No. 621,872

6 Claims. (Cl. 105—180)

This invention relates to railroad cars and, in particular, to an improved construction specially adapted for passenger cars operating at high speeds.

Passenger-car construction has become more or less standardized, at least so far as concerns the fundamentals, i. e., the body, sub-frame and the supporting trucks. The known construction, however, is subject to serious disadvantages such as a high center of gravity, limited number of bearing points for the body on the trucks, slippage of wheels on the track, particularly on curves, and excessive transmission of shocks and vibration through the spring suspensions to the body, to mention only a few. I have invented an improved car construction which eliminates many of these objections and minimizes others.

In a preferred embodiment my construction includes a pair of independent wheel housings for supporting each end of the car body, each housing having a plurality of spring-supported bearings for carrying the load imposed thereon, as well as a plurality of wheels mounted on axles journaled in the housing. The housings of each pair have spacer bars extending therebetween and universally pivoted thereto. Each housing has a socket near the forward end adapted to receive a vertical pivot pin depending from the car body. The bearings on the housings which support the body permit angular movement therebetween about the pivot pins.

Further novel features and advantages of my construction will be pointed out in the course of the following detailed description of a preferred embodiment, referring to the accompanying drawings.

In the drawings,

Figure 1 is a longitudinal vertical section through a car showing a truck in elevation;

Figure 2 is a plan view of a truck with the car body removed, showing the pivot pins in horizontal section;

Figures 3, 4 and 5 are half sections taken transversely along the planes III—III, IV—IV and V—V, respectively, of Figure 1;

Figure 6 is a portion of Figure 4 to enlarged scale; and

Figure 7 is an explanatory diagram.

Referring in detail to the drawings, the construction of my invention includes a car body having a center sill 10 and side sills 11 connected by spaced diaphragm plates 12. The center sill is fabricated from suitable plates, angles, etc., and may be braced at intervals along its length by diaphragm plates 13. Side walls 14 extend above and below the sills 11. Floor plates 15 are supported on beams 16 extending inwardly from the side sills. A depressed aisle floor plate 17 rests directly on the center sill.

Each end of the car is supported on a novel form of truck indicated generally at 18. Each truck comprises a pair of spaced housings 19 and 20 which may conveniently be in the form of hollow castings. Each casting has a plurality of stub axles journaled in bearings 21 secured to the housing adjacent the lower edge thereof. A wheel 22 is mounted on each axle for traveling on a track rail indicated at 23.

Spring pockets 24 are formed in the housings adjacent the wheels. Bearing blocks 25 are supported in the pockets 24 on compression springs 26 and have rollers 28 journaled therein. Bearing blocks 27 on the beams 16 rest on the rollers 28. This construction permits limited lateral movement between the truck and car body. Such movement, of course, causes slight rotation of the rollers 28. Yoke castings 30 overlie the housings and extend between the center sill and the side sills. Opposed spring pockets 31 and 32 in the castings 30 are adapted to accommodate compression springs 33 engaging seats 34 on opposite sides of the housings near the top thereof. These springs tend normally to center the housings relative to castings 30. The housings 19 and 20 are maintained in properly spaced relation by spacer bars 35 connected thereto through universal joints 35'. These spacer bars may conveniently extend between the inner bearings 21, as shown in Figures 2 and 3.

A pivot pin 36 extends downwardly from each side of the car body into a socket 37 formed in each of the housings. The pins are mounted on and depend from beams 38 forming part of the sub-frame of the car body. A compression spring 39 may be disposed in the socket 37 below each pin 36 to transmit a portion of the weight of the body to the truck. The truck shown in the drawings happens to be the rear truck of the car. The sockets 37 for the pivot pins are located adjacent the forward end of the truck. An additional spacer bar 35a extends between the housings adjacent their forward ends.

It will be understood that the weight of the car body is applied to the housings principally through the springs 26. The pull necessary to move the trucks with the car body is transmitted from the latter to the former by the pins 36. This construction permits the truck to swing through a limited angle beneath the body when traversing a curve, the bearings 25, 27 and 28 being such as to facilitate this movement. The spacer bars serve to keep the housings in properly spaced relation without interfering with the angular movement of the truck as a whole just mentioned. The springs 33 tend to center the housings relative to the bearing 27 or, conversely, to position the car body properly relative to the truck, as the truck leaves a curve and enters a straight stretch as well as to absorb lateral motion of the housings caused by irregularities in the truck.

The angular movement of the truck in negotiating a curve is not sufficient to affect the gauge of the wheels materially. This is shown graphically in Figure 7 in which $L_1$ and $L_2$ are lines parallel to the longitudinal axis of the car body corresponding to the positions of the housings on straight track; $R_1$ and $R_2$ represent the positions of the housings on the curve of minimum radius to be traversed (maximum lateral displacement); and D is the maximum lateral displacement of the truck, 6''. The length of $L_1$, $L_2$, $R_1$ and $R_2$ is assumed to be 84''. T and Y are the standard gauge of railroad track 56.5'', and are kept constant by spacer bars 35 and 35a. X is normal to $R_2$ and $R_1$ and is the shortened gauge of the truck on maximum deflection.

$$\cos \text{angle } A = \frac{3}{84} = .03571+$$

angle $A$ = approximately 88°
angle $B = 2(90° - \text{angle } A) = 4°$ (approx.)
angle $C = 90° - \text{angle } B = 86°$ (approx.)

$$\frac{X}{Y} = \sin \text{angle } C = \frac{X}{56.5}$$

$X = (56.5)(\sin 86°) = (56.5)(0.998)$
$X = 56.3870$
$Y = 56.5000$

Difference of $Y - X = 0.1120''$ = amount of shortening of gauge under maximum conditions.

It will be apparent that the construction described is characterized by numerous advantages over cars as now built. Since the forward pull on the truck is applied ahead of the center, the stability of the truck is improved, particularly when accelerating or braking. At the same time, sufficient freedom for lateral motion is provided to absorb shocks caused by track irregularities. The level of the aisle floor may be made quite low. The same is true of the side portions of the floor except over the wheel housings. The center of gravity is thus lowered and stability of the body increased. The load of the body weight is applied to the truck at a relatively large number of widely spaced points, thus limiting the side sway.

As the car traverses a curve, the lateral movement of the truck causes the center of support to move outwardly thereby further limiting the tendency to side sway. The horizontal springs 33 absorb the centrifugal force when traversing a curve. On a straightaway, these springs absorb lateral forces set up by irregularities in the track.

Each wheel turns independently of all the others, thus entirely eliminating slippage which always occurs with the conventional trucks on curves and, to some extent, also on a straightaway. This slippage is the cause of considerable wear on the wheels and track surface. The elimination of slippage permits the wheels to retain true roundness much longer than is possible with present truck constructions. This is important in maintaining continuous adherence of brake shoes which is necessary for high-speed operation. The taper on the wheel surface may be eliminated because of the independent wheel mounting and the clearance between wheel flanges and the sides of the rail heads reduced. This reduces vertical vibration of the body caused by side sway of the trucks. Similarly, the allowable play between the wheel flanges and track may be reduced which minimizes such side sway. The independent wheel mounting also permits better absorption of the shock caused by traversing rail joints.

Although I have illustrated and described but a preferred embodiment of my invention, changes in the details and arrangements shown may be made without departing from the spirit of the invention or the scope of the appended claims.

I claim:

1. In a railroad car, a truck including a pair of spaced elongated wheel housings, each adapted to accommodate wheels engaging one rail of a track, a plurality of wheels independently journaled in each housing, bearing rollers spaced along the top of said housings, a car body resting on said rollers, a pivot pin depending from the body into the forward end of each housing, and spacer bars extending between and pivoted to said housings.

2. In a railroad car, a truck including a pair of spaced elongated wheel housings, each adapted to accommodate wheels engaging one rail of a track, a plurality of wheels independently journaled in each housing, bearing rollers spaced along the top of said housings, a car body resting on said rollers, a pivot pin depending from the body into the forward end of each housing, and spacer bars extending between and pivoted to said housings, said housings having sockets to receive said pins, the sockets having bearing springs therein.

3. In a railroad car, a truck including a pair of spaced elongated wheel housings, each adapted to accommodate wheels engaging one rail of a track, a plurality of wheels independently journaled in each housing, bearing rollers spaced along the top of said housings, spring cushions supporting said rollers in said housings, a car body resting on said rollers, a pivot pin depending from the body into the forward end of each housing, and spacer bars extending between and pivoted to said housings.

4. In a railroad car, a truck including a pair of spaced elongated wheel housings, each adapted to accommodate wheels engaging one rail of a track, a plurality of wheels independently journaled in each housing, bearing rollers spaced along the top of said housings, a car body resting on said rollers, horizontal centering springs on said body engaging opposite sides of said housings, a pivot pin depending from the body into the forward end of each housing, and spacer bars extending between and pivoted to said housings.

5. In a railroad car, a truck including a pair of spaced elongated wheel housings, each adapted to accommodate wheels engaging one rail of a track, a plurality of wheels independently journaled in each housing, bearing rollers spaced along the top of said housings, a car body resting on said rollers, a pivot pin depending from the body into the forward end of each housing, spacer bars extending between said housings and universal joints connecting the spacer bars to the housings.

6. In a railroad car, a truck including a pair of spaced elongated wheel housings, each adapted to accommodate wheels engaging one rail of a track, opposed pairs of bearings spaced along said housings, stub axles journaled in said bearings with wheels thereon, bearing rollers spaced along the top of said housings, a car body resting on said rollers, a pivot pin depending from the body into the forward end of each housing, and spacer bars extending between and pivoted to said housings.

DAVID E. GERMAIN.

REFERENCES CITED

The following references are of record in the file of this patent:

UNITED STATES PATENTS

| Number | Name | Date |
|---|---|---|
| 3,457 | Quail | Feb. 28, 1844 |
| 843,420 | Strickler | Feb. 5, 1907 |
| 999,192 | Kellogg | July 25, 1911 |
| 1,331,887 | Van Dyke, Jr. | Feb. 24, 1920 |
| 1,669,347 | Schmeck | May 8, 1928 |